United States Patent
Lim et al.

(10) Patent No.: US 10,077,331 B2
(45) Date of Patent: Sep. 18, 2018

(54) POLYURETHANE FILTER FOAM

(71) Applicant: Hyundai Motor Company, Seoul (KR)

(72) Inventors: Byung Guk Lim, Seoul (KR); Sang Do Park, Suwon-si (KR); Dong Woo Jeong, Hwaseong-si (KR); Seok Nam Kang, Seoul (KR); Hoon Bok Lee, Seongnam-si (KR); Kug Hun Han, Seoul (KR); Sang Ho Kim, Incheon (KR); Kwon Yong Choi, Seoul (KR); Soon Joon Jung, Seoul (KR); Sung Hoon Lee, Seoul (KR); Mu Young Kim, Hwaseong-si (KR); Kyung Sam Kim, Goyang-si (KR); Yoo Kon Cho, Maengdong-myeon (KR); Sung Il Lee, Cheongju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/391,555

(22) Filed: Dec. 27, 2016

(65) Prior Publication Data

US 2018/0057630 A1    Mar. 1, 2018

(30) Foreign Application Priority Data

Aug. 31, 2016 (KR) .................. 10-2016-0111986

(51) Int. Cl.
| | |
|---|---|
| *C08G 18/48* | (2006.01) |
| *C08G 18/76* | (2006.01) |
| *C08G 18/79* | (2006.01) |
| *B01D 39/16* | (2006.01) |
| *C08G 101/00* | (2006.01) |

(52) U.S. Cl.
CPC ......... *C08G 18/48* (2013.01); *B01D 39/1676* (2013.01); *C08G 18/7671* (2013.01); *C08G 18/797* (2013.01); *C08G 2101/0083* (2013.01)

(58) Field of Classification Search
CPC ..................... B01D 39/1676; C08G 18/48; C08G 18/7671; C08G 18/797; C08G 2101/0083
See application file for complete search history.

(56) References Cited

U.S. PATENT DOCUMENTS

2014/0031443 A1* 1/2014 Sasaki ............... C08G 18/4866
521/115

FOREIGN PATENT DOCUMENTS

| JP | 06-322057 A | 11/1994 |
|---|---|---|
| JP | 5465691 B2 | 4/2014 |
| JP | 2016-006203 A | 1/2016 |
| KR | 10-2010-0033971 A | 3/2010 |
| KR | 10-1400937 B1 | 5/2014 |
| WO | WO 2007/099995 A1 | 9/2007 |

* cited by examiner

*Primary Examiner* — John Cooney
(74) *Attorney, Agent, or Firm* — Morgan, Lewis & Bockius LLP

(57) ABSTRACT

A polyurethane filter foam is provided herein. The polyurethane filter foam may have improved permeability by having both a small cell and a large cell in a range for maximizing the opening property of the foam. In some instance, this is achieved by specifically configuring and foaming a composition of polyether polyol and methylene diphenyl diisocyanate (MDI) to manufacture the polyurethane foam. The polyurethane foam of the present invention can be manufactured without performing a reticulation process.

6 Claims, 3 Drawing Sheets

Example 1 (foam cell)

Comparative Example 5 (foam cell)

Comparative Example 5 (Reticulation cell)

POLYURETHANE FILTER FOAM

CROSS-REFERENCE TO RELATED APPLICATION

This application claims under 35 U.S.C. § 119(a) the benefit of Korean Patent Application No. 10-2016-0111986, filed on Aug. 31, 2016, the entire contents of which are incorporated herein by reference for all purposes.

BACKGROUND

Technical Field

The present invention relates to polyurethane filter foam, and more particularly, a polyurethane filter foam with improved permeability by having both a plurality of small cells and a plurality of large cells in a range that maximizes an open cell structure in the foam. The polyurethane filter foam of the present invention can be manufactured by specifically configuring and foaming a composition of polyether polyol and methylene diphenyl diisocyanate (MDI).

Background Art

Polyurethane is a polymer synthesized by polymerization of polyol and isocyanate. The polyurethane foam can be foamed by the generation of carbon dioxide gas as water which is used as a blowing agent reacts with isocyanate and is evaporated into a polymer cell.

Polyurethane foam may be divided into hard foam having a closed cell structure and soft foam having an open cell structure according to a cell structure. Soft polyurethane foam has good mechanical strength (e.g., elongation, tensile strength, and wear resistance) and has an open cell structure to improve permeability and a cushion property. Soft polyurethane foam has been widely used as various uses in all industries including components of automotive, electric, and electronic products or household goods.

Filter foam is soft polyurethane foam and has been used as filters for preventing noise or vibration, hydroponics, air filters for a vehicle, and the like. Generally, the polyurethane filter foam used has been produced by using a process line for manufacturing soft slabstock foam. However, since the filter foam has a larger cell and a thicker cell wall than common soft foam, the filter foam is subjected to a reticulation process by using heat after foaming.

FIG. 1 schematically illustrates a process of manufacturing filter foam using a process line of manufacturing soft slabstock foam.

According to a general method, foam is manufactured by injecting a type of polyol and a type of isocyanate (e.g., toluene diisocyanate) to the process line of manufacturing the slabstock foam. The manufactured foam is soft slab foam having a dense and uniform cell structure and permeability is insufficient to be applied as the filter foam. In order to enhance permeability of the urethane foam, a cell which has a size as large as possible and is 100% opened is required. However, when the size of the cell is large and a large amount of gas is simultaneously discharged at the time when the foam is opened, a collapse possibility is increased. One skilled in the art recognizes that filter foam in the related art is made in a non-opened state and then is subject to a film forming process to produce large cell openings. Herein, since making the large cell in the closed cell structure is not a normal manufacturing process, various defects such as collapse of the foam during foaming and a mixed defect may occur.

The above information disclosed in this Background section is only for enhancement of understanding of the background of the invention and therefore it may contain information that does not form the prior art that is already known in this country to person of ordinary skill in the art.

SUMMARY OF THE DISCLOSURE

The present invention has been made in an effort to solve the above-described problems associated with prior art.

An aspect of the present invention is to provide polyurethane filter foam that provides the needed density, hardness, and permeability to manufacture soft polyurethane foam.

In another aspect, the present invention provides polyurethane filter foam manufactured by foaming (A) polyether polyol and (B) methylene diphenyl diisocyanate (MDI).

The (A) polyether polyol is a polyol resin mixture containing (A-1) from about 10 to 40 wt % of difunctional polyether polyol having a hydroxyl value of from about 0 to 100 mgKOH/g; (A-2) from about 10 to 50 wt % of trifunctional polyether polyol addition-polymerized with alkylene oxide and having a hydroxyl value of from about 20 to 100 mgKOH/g; and (A-3) from about 10 to 50 wt % of hexafunctional polyether polyol having a hydroxyl value of from about 50 to 100 mgKOH/g.

In addition, the (B) methylene diphenyl diisocyanate (MDI) is an isocyanate mixture containing (B-1) from about 10 to 80 wt % of MDI monomers; (B-2) from about 0.1 to 20 wt % of carbodiimide modified MDI having a weight average molecular weight of 250 to 350 g/mol, (B-3) from about 10 to 50 wt % of polymeric MDI having a weight average molecular weight of from about 300 to 400 g/mol, and (B-4) from about 0.1 to 50 wt % of MDI prepolymer having a weight average molecular weight of from about 500 to 1,000 g/mol prepared by prepolymerizing the MDI monomers and the polyether polyol.

In one embodiment, the polyurethane filter foam of the present invention may have apparent density measured by MS257-06 of from about 40 to 65 kg/m$^3$, ILD 25% hardness of from about 10 to 25 kgf/314 cm$^2$, and permeability of from about 200 to 500 L/min.

In another embodiment, the polyurethane filter foam of the present invention may be applied for air purification.

Polyurethane filter foam of the present invention has a sufficiently excellent permeability (e.g., a satisfactory or desirable permeability) and is manufactured using only a foam process, and does not include a reticulation process.

Further, by omitting the reticulation process, facility costs, and a risk of gas explosion according to hot heat treatment are decreased. Also generation of bad smell due to the remaining combustion material in the polyurethane filter foam is reduced.

Since the polyurethane filter foam of the present invention controls cell size and regularity through changes in raw material composition, production stability is improved as compared to the foam in the related art. In addition, the overall error rate is reduced.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention.

Figure 1:
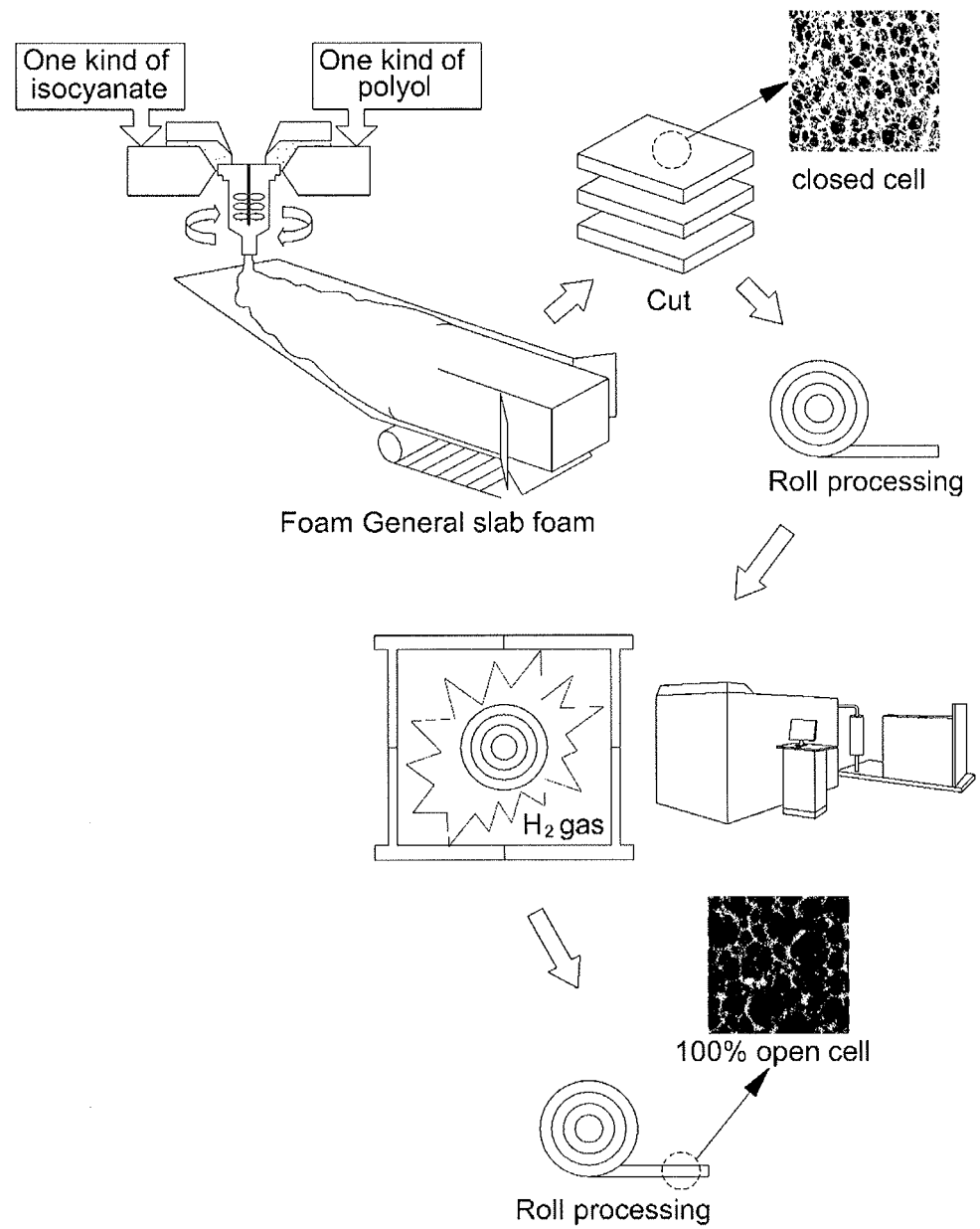
FIG. 1 schematically illustrates a process of manufacturing filter foam using a process line of manufacturing soft slabstock foam.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Polyurethane filter foam of the present invention specifically configures a composition of polyol and isocyanate to control a cell size or an open structure of polyurethane foam.

In order to be used as filter foam, urethane foam requires excellent permeability and therefore, an open cell which has a large cell size and an opened structure is needed. However, when the cell size is increased, the possibility of collapse is high when the foam is opened. For this reason, in a process of manufacturing filter foam in the related art, after a non-open large cell was made, in order to ensure permeability, a reticulation process was additionally performed. In contrast to having only a large cell, in the polyurethane filter foam of the present invention, a small cell and a large cell are formed together for production stability in a range of maximizing the open property of the foam.

The polyurethane filter foam of the present invention is manufactured by foaming (A) polyether polyol, (B) methylene diphenyl diisocyanate (MDI), and a general foaming additive. The filter foam comprises cells that have sizes as large as possible and are well opened such that the large cells and the small cells simultaneously exist. These characteristics or properties are obtained by adjusting the molecular weight of the raw materials, the number of functional groups, the cross-linking density, the heat of reaction, and the catalyst balance, which are factors that can affect the cell size and the open property of the foam. Components used for manufacturing the polyurethane filter foam according to the present invention will be described below in detail.

(A) Polyether Polyol

Polyol used in the present invention can include various polyether polyols having functional groups, molecular weights, PO/EO additional contents, and sequences. In a process of producing the polyurethane foam, the number of functional groups, a molecular weight, the content of EO, a position, and the like are factors that affect the size of the cell and structure of the foam. For instance, as urethane reaction velocity is increased or compatibility between the used raw materials is good, the size of the cell tends to be decreased. The reaction velocity is increased as the number of functional groups of the polyol is increased and the molecular weight is decreased. As the content of ethylene oxide (EO) added to a terminal of the polyol is increased, reactivity is increased. As a result, in the present invention, difunctional, trifunctional, and hexafunctional polyether polyols can be mixed and used to be structurally stabilized without collapse while controlling the cell size and the open property in the foaming process.

In some embodiments of the present invention, the polyol resin mixture containing (A-1) from about 10 to 40 wt % of (e.g., from about 10 wt %, 15, 20, 25, 30, 35, or about 40 wt %) difunctional polyether polyol; (A-2) from about 10 to 50 wt % (e.g., from about 10 wt %, 15, 20, 25, 30, 35, 40, 45, or about 50 wt %) of trifunctional polyether polyol; and (A-3) from about 10 to 50 wt % (e.g., from about 10 wt %, 15, 20, 25, 30, 35, 40, 45, or about 50 wt %) of hexafunctional polyether polyol is used.

The (A-1) difunctional polyether polyol is polyether polyol having two hydroxyl groups and 20 to 100 mgKOH/g of the hydroxyl value. In this case, when the hydroxyl value is less than 20 mgKOH/g, the foam may be collapsed by very slow reactivity, an excessive open cell, and the like, whereas when the hydroxyl value is greater than 100 mgKOH/g, problems such as fast reactivity, generation of the closed cell, and an increase in hardness may occur. Preferably, the difunctional polyether polyol may be polyether polyol in which an ethylene oxide (EO) or propylene oxide (PO) group is added to the middle or the terminal of the molecular chain. The difunctional polyether polyol may be prepared and used by addition-polymerizing the EO and/or PO by using divalent alcohols such as dipropylene glycol (DPG), diethylene glycol (DEG), and monoethylene glycol (MEG) as a start material.

The difunctional polyether polyol may be included in a range of from about 10 to about 40 wt % (e.g., from about 10 wt %, 15, 20, 25, 30, 35, or about 40 wt %) in the polyol. In a range deviating from the content range, the filter foam having desired hardness and elasticity cannot be produced and the entire foam generation balance is broken.

The (A-2) trifunctional polyether polyol is polyether polyol having three hydroxyl groups and from about 20 to 100 mgKOH/g (e.g., about 20, 30, 40, 50, 60, 70, 80, 90 or about 100 mgKOH/g) of the hydroxyl value. In this case, when the hydroxyl value is less than 20 mgKOH/g, the foam may be collapsed by very slow reactivity, an excessive open cell, and the like, whereas when the hydroxyl value is greater than 100 mgKOH/g, problems such as fast reactivity, generation of the closed cell, and an increase in hardness may occur. In some embodiments, the trifunctional polyether polyol may be polyether polyol in which an ethylene oxide (EO) or propylene oxide (PO) group is added to the middle or the terminal of the molecular chain. In certain embodiments, the trifunctional polyether polyol in which the propylene oxide (PO) group is added to the middle of the molecular chain and the ethylene oxide (EO) is added to the terminal may rapidly induce urethane reactivity. The trifunctional polyether polyol may be prepared and used by addition-polymerizing the EO and/or PO by using trivalent alcohols such as glycerin and trimethylolpropane as a start material.

The trifunctional polyether polyol may be included in a range of from about 10 to 50 wt % (e.g., from about 10 wt %, 15, 20, 25, 30, 35, 40, 45, or about 50 wt %) in the polyol. When the content of the trifunctional polyether polyol among the polyol components is less than 10 wt %, an elasticity effect required as the filter foam cannot be expected, and when the content thereof is greater than 50 wt %, the urethane foam is very stable to interrupt the formation of the large cell.

The (A-3) hexafunctional polyether polyol is polyether polyol having six hydroxyl functional groups and from about 50 to 100 mgKOH/g (e.g., about 50, 60, 70, 80, 90, or about 100 mg KOH/g) of the hydroxyl value. In this case, when the hydroxyl value is less than 50 mgKOH/g, the foam may be collapsed by very slow reactivity, an excessive open cell, and the like, whereas when the hydroxyl value is greater than 100 mgKOH/g, problems such as fast reactivity, generation of the closed cell, and an increase in hardness may occur. The hexafunctional polyether polyol may be prepared and used by addition-polymerizing the EO and/or PO by using hexavalent alcohols such as sorbitol as a start material.

The hexafunctional polyether polyol may be included in a range of 10 to 50 wt % (e.g., from about 10 wt %, 15, 20, 25, 30, 35, 40, 45, or about 50 wt %) in the polyol. When the content of the hexafunctional polyether polyol among the polyol components is less than 10 wt %, a collapse phenomenon of the cell cannot be effectively prevented in the foaming process, and when the content is greater than 50 wt %, there is a problem in that the hardness of the foam is excessively increased.

(B) Methylene Diphenyl Diisocyanate (MDI)

In the present invention, an isocyanate mixture comprising MDI prepolymer prepared by prepolymerizing (B-1) methylene diphenyl diisocyanate (MDI) monomers, (B-2) carbodiimide-modified MDI, (B-3) polymeric MDI, and (B-4) MDI monomers and the polyol is used.

As described above, in order to have both the large cell and the small cell, various types of polyols having a variety of reactivity and reaction selectivity and isocyanate can be mixed and used.

The (B-1) methylene diphenyl diisocyanate (MDI) monomer has the fastest reaction velocity among the diisocyanate components.

The MDI monomers may be included in a range of from about 10 to 80 wt % (e.g., about 10, 20, 30, 40, 50, 60, 70, or about 80 wt %) in the isocyanate. The MDI monomers in the isocyanate components is the shortest molecule and has fast reactivity, and when the content is less than 10 wt %, initial reactivity is insufficient and thus it is difficult to generate the foam having a desired shape due to the overall slowed reaction. Further, when the content of the MDI monomers is greater than 80 wt %, the collapse may occur in the foam generation process due to excessive heat.

The (B-2) carbodiimide modified MDI is prepared by polymerizing carbodiimide and the MDI monomers and a weight average molecular weight is from about 250 to 300 g/mol (e.g., about 250, 255, 260, 265, 270, 275, 280, 285, 290, 295, or about 300 g/mol). The content of the carbodiimide in the modified MDI may be in a range of from about 4 to 10 wt % (e.g., about 4 wt %, 5, 6, 7, 8, 9, or about 10 wt %).

The carbodiimide modified MDI may be included in a range of from about 0.1 to 20 wt % (e.g., about 0.1 wt %, 0.5, 1, 2, 3, 4, 5, 6, 7, 8, 9, 10, 11, 12, 13, 14, 15, 16, 17, 18, 19, or about 20 wt %) in the isocyanate. The carbodiimide modified MDI is used for preventing a freezing phenomenon when the temperature falls below freezing during the winter and is an expensive raw material compared with other isocyanate components and thus the usage amount may be limited. Accordingly, since there may be no freezing during the summer, the usage amount may be appropriately reduced if necessary.

The (B-3) polymeric MDI uses polymeric MDI in which the MDIs having a variety of the number of functional group and the molecular weight are mixed and preferably, uses the polymeric MDI having a weight average molecular weight of 300 to 400 g/mol (e.g., about 300 g/mol, 310, 320, 330, 340, 350, 360, 370, 380, 390, or about 400 g/mol).

The polymeric MDI may be included in a range of 10 to 50 wt % (e.g., from about 10 wt %, 15, 20, 25, 30, 35, 40, 45, or about 50 wt %) in the isocyanate. When the content of the polymeric MDI among the isocyanate components is less than 10 wt %, a desired cross-linking density may not be obtained, and when the content is greater than 50 wt %, a lot of closed cells are formed and thus it is difficult to open the foam.

The (B-4) MDI prepolymer is prepared by prepolymerizing the MDI monomers and polyol and a weight average molecular weight is 250 to 1,000 g/mol (e.g., about 250, 300, 350, 400, 450, 500, 550, 600, 650, 700, 750, 800, 850, 900, 950, 960, 970, 980, 990 or about 1000 g/mol). In this case, the polyol used for preparing the prepolymer uses polyol having 20 to 100 of hydroxyl value and difunctional or trifunctional groups among the polyols described above and the hexafunctional polyol may be excluded because viscosity may be rapidly increased. The MDI prepolymer plays an important role in controlling a polyurethane reaction speed and controlling heat in the foaming process.

The MDI prepolymer may be included in a range of 0.1 to 50 wt % (e.g., about 0.1 wt %, 0.5, 1, 2, 3, 4, 5, 6, 7, 8, 9, 10, 11, 12, 13, 14, 15, 16, 17, 18, 19, 20, 25, 30, 35, 40, 45, or about 50 wt %) in the isocyanate. The usage of the prepolymer having greater than 50 wt % has adverse effects to prepare desired foam due to an increase in viscosity, reduction in heat, and the like in addition to an increase in cost.

In the present invention, the (B) isocyanate is used in a range of from about 40 to 70 parts by weight (e.g., about 40, 45, 50, 55, 60, 65, or about 70 parts by weight) based on 100 parts by weight of the (A) polyether polyol. A mixed ratio of the isocyanate may vary according to density, hardness, elasticity, and the like of a desired product.

(C) Additives

In the present invention, additives for forming general polyurethane foam may be included.

Additives included in the composition of the present invention may include at least one selected from a chain extender, a cross-linking agent, a surfactant, a blowing agent, a catalyst, a cell opener, and a heat stabilizer. The additives may be included to be appropriately selected in a range of 0.001 to 20 parts by weight (e.g., about 0.001, 0.005, 0.01, 0.05, 0.1, 0.5, 1, 2, 3, 4, 5, 6, 7, 8, 9, 10, 11, 12, 13, 14, 15, 16, 17, 18, 19 or about 20 parts by weight), preferably, 0.01 to 10 parts by weight (e.g., about 0.01, 0.02, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or about 10 parts by weight) based on 100 parts by weight of polyol.

Additive components which may be included in the polyurethane foam composition of the present invention will be described below in detail.

The chain extender and the cross-linking agent serve to cross-link so that the polyurethane foam is not collapsed and open the foam by using a high calorific value.

The chain extender is a polyol compound which is generally used in a polyurethane synthesis field and may include, for example, straight chain aliphatic diol such as ethylene glycol, propylene glycol, 1,3-propanediol, 1,4-butanediol, 1,6-hexanediol and neopentyl glycol; alicyclic diol such as 1,4-cyclohexane dimethanol, hydrogenated bisphenol A, and tricyclodecane dimethanol; aromatic diol such as bisphenol A, xylylene diol and hydroquinone diethyl ether; (poly)ether glycol such as diethylene glycol, triethylene glycol, polyethylene glycol, polypropylene glycol, polytrimethylene glycol and polytetramethylene glycol; polyol such as trimethylol propane, trimethylol ethane, glycerin, hexane triol, pentaerythritol and sorbitol; polyester polyols such as polyethylene adipate and polytetramethylene adipate; polycaprolactone polyol; polycarbonate polyol; polybutadiene polyol; and castor oil. The chain extender may use one or two or more mixtures. The chain extender may use 1 to 10 parts by weight (e.g., about 1, 2, 3, 4, 5, 6, 7, 8, 9, or 10 parts by weight) based on 100 parts by weight of polyol.

The cross-linking agent may include dialkyl peroxide, peroxy ketal, peroxy ester, peroxy monocarbonate, diacryl peroxide, peroxy dicarbonate, hydroperoxide, ketone peroxide, dicumyl peroxide, di-(2-t-butyl peroxyisopropyl benzene), etc as organic peroxide. The cross-linking agent may use one or two or more mixtures. The cross-linking agent may use 1 to 10 parts by weight (e.g., about 1, 2, 3, 4, 5, 6, 7, 8, 9, or 10 parts by weight) based on 100 parts by weight of polyol.

The surfactant prevents cells generated when the cells are formed in the polyurethane foam from being united or destroyed and serves to control cells having uniform shapes and sizes to be formed. The surfactant is generally used in the art and not particularly limited in the present invention, but a silicon-based surfactant may be generally used. The silicon surfactant may be one or more selected from polysiloxne and derives thereof and particularly, may be a polyalkylene oxide methyl siloxane copolymer. The surfactant may use 0.01 to 5 parts by weight (e.g., about 0.01, 0.02, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or about 5 parts by weight), preferably 0.1 to 3 parts by weight (e.g., about 0.1, 0.2, 0.3, 0.4, 0.5, 0.6, 0.7, 0.8, 0.9, 1, 1.3, 1.5, 1.7, 2, 2.2, 2.5, 2.8, 2.9, or about 3 parts by weight) based on 100 parts by weight of polyol. In this case, when the usage amount of the surfactant is too small, there is a problem in that the formation of the foam is non-uniform, and when the usage amount is too large, the shrinkage problem of the foam and a fatal problem in which a flame retardant characteristic is reduced may occur.

The blowing agent may appropriately select and use known blowing agent components which are used as a composition for a soft polyurethane foam body for a long time by considering various kinds of properties required for the foam. As the blowing agent, water may be representatively used, and in addition, may use at least one selected from methylene chloride, n-butane, isobutane, n-pentane, isopentane, diethyl ether, acetone, carbon dioxide, etc. These blowing agents may be appropriately selected and used according to known using methods, and density or other characteristics of the required foam. Accordingly, in the present invention, the usage amount of the blowing agent is not particularly limited, but if limited, the blowing agent may be used within a range of 1 to 5 parts by weight (e.g., about 1, 2, 3, 4, or 5 parts by weight) based on 100 parts by weight of polyol.

The catalyst serves to promote reaction between the polyol and the isocyanate compound. The catalyst may use at least one selected from amine catalysts such as triethylene diamine, triethyl amine, N-methyl morpholine, and N-ethyl morpholine, and organic thin catalysts such as stannous octoate and dibutyltin dilaurate (DBTDL). The catalyst may be used in a range of 0.01 to 10 parts by weight (e.g., about 0.01, 0.02, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or about 10 parts by weight), preferably 0.5 to 5 parts (e.g., about, 0.5, 0.6, 0.7, 0.8, 0.9, 1, 1.5, 2, 2.5, 3, 3.5, 4, 4.1, 4.5, 4.7, 4.9, or about 5 parts by weight) by weight based on 100 parts by weight of polyol. When the usage amount of the catalyst is too small, the reaction is delayed and the cured defect occurs, and when the content is too large, shrinkage or cracks in the foam may occur.

The cell opener may use polyether polyol. The cell opener is particularly obtained by addition-polymerizing ethylene oxide (EO) and propylene oxide (PO) and may use polyether polyol in which a weight ratio of EO:PO is 50 to 80:20 to 50 wt %, a weight average molecular weight is 3,000 to 8,000 g/mol, a OH value is 1 to 10 mg KOH/g. In some embodiments, the weight ratio of EO:PO is 50 wt % to 80 wt % of EO to 20 wt % to 50 wt % of PO. The cell opener may use 0.1 to 5 parts by weight (e.g., about, 0.1, 0.2, 0.3, 0.4, 0.5, 0.6, 0.7, 0.8, 0.9, 1, 1.5, 2, 2.5, 3, 3.5, 4, 4.1, 4.5, 4.7, 4.9, or about 5 parts by weight) based on 100 parts by weight of polyol. In this case, when the usage amount of the cell opener is too small, the foam is shrunken and thus the shape is not maintained, and when the usage amount is too large, the problems such as collapse of the foam and cracks may occur.

The heat stabilizer may add an antioxidant for preventing degradation. As the antioxidant, t-butyl hydroxy toluene (BHT), pentaerythrityl-tetrakis-3-(3,5-di-t-butyl-4-hydroxyphenyl) propionate, octadecyl-3-(3,5-di-t-butyl-4-hydroxyphenyl)-propionate, ethylhexyl phosphate, tri(nonylphenyl) phosphite, 4,4 heat stabilizer may add an antioxidant for preventing degradation. As the antioxidant, t-butyl hydroxy toluene (BHT), pentaerythrityl-tetrakis-3-(3,5-di-t-butyl-4-hydroxyphenyl) propionate, octadecyl-3-(3,5-di-t-butly-4-hydroxyphenyl)-propionate, ethylhexyl phosphate, tri(nonylphenyl)phosphite, 4,4'-bis-α,α'-dimethyl benzyl diphenyl amine, 2-t-butyl-4-ethylphenol, 2,6-di-t-butyl-4-ethylphenol, and the like may be used. The antioxidant may use one or two mixtures. The antioxidant many be used in a range of 1 to 10 parts by weight (e.g., about 1, 2, 3, 4, 5, 6, 7, 8, 9, or about 10 parts by weight), preferably 1 to 3 parts by weight based on 100 parts by weight of polyol. In addition, additives which are generally used in a manufactured field of the polyurethane foam may be included.

The present invention provides polyurethane filter foam manufactured by foaming the foam composition described above. Properties of a filter comprising the polyurethane filter foam include, but are not limited to, an apparent density measured by MS257-06 of about 40 to 65 kg/m$^3$ (e.g., about 40, 45, 50, 55, 60, or about 65 kg/m$^2$), ILD 25% hardness of about 10 to 25 kgf/314 cm$^2$ (e.g., about 10 kgf/314 cm$^2$, 11, 12, 13, 14, 15, 16, 17, 18, 20, 21, 22, 23, 24, or about 25 kgf/314 cm$^2$), and permeability of about 200 to 500 L/min (e.g., about 200 L/min, 225, 250, 275, 300, 325, 350, 375, 400, 425, 450, 475, or about 500 L/min).

Accordingly, the polyurethane filter foam provided in the present invention may be used for air purification and in detail, may be applied as a vehicle air filter.

The present invention described above will be described in more detail based on the following Examples and the present invention is never limited to the following Examples.

EXAMPLES

Preparation Example 1: Preparation of Isocyanate Mixture

An isocyanate mixture was prepared by mixing (B-1) 60 wt % of MDI monomers, (B-2) 10 wt % of carbodiimide modified MDI having weight average molecular weight of 300 g/mol, (B-3) 20 wt % of polymeric MDI having weight average molecular weight of 350 g/mol, and (B-4) 10 wt % of MDI prepolymer having weight average molecular weight of 500 g/mol.

Examples 1 to 3 and Comparative Examples 1 to 3

Figure 2:
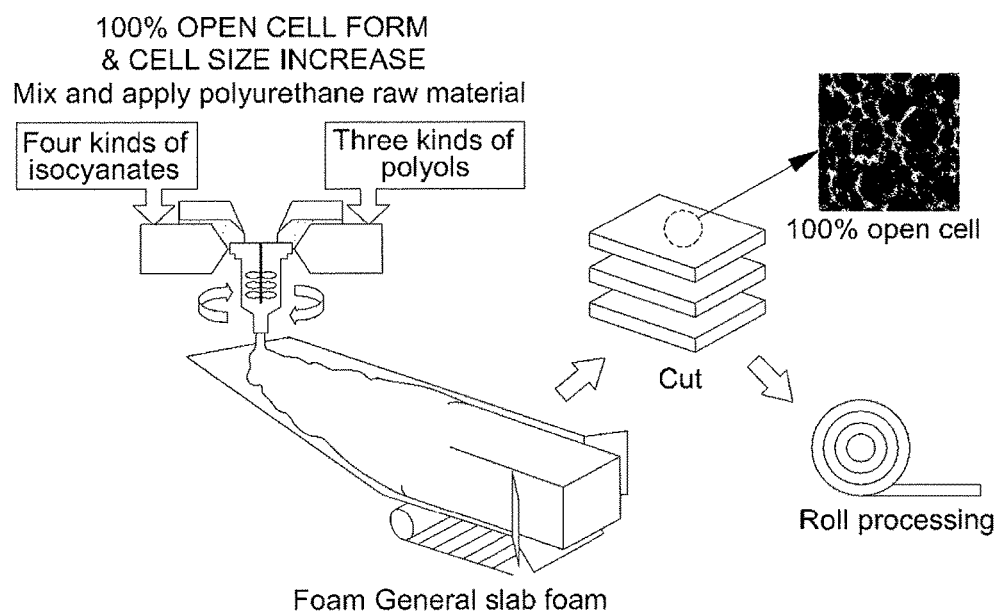
FIG. 2 is a schematic diagram of describing a process of manufacturing filter foam using a process line of manufacturing polyurethane filter foam according to the present invention.

A polyurethane filter foam specimen was prepared by using manufacturing equipment as illustrated in FIG. 2.

In detail, polyol, a chain extender, a cross-linking agent, a blowing agent, a catalyst, a cell opener, a silicone surfactant, and a heat stabilizer were mixed according to compositions and content ratios illustrated in Table 1 below and sufficiently mixed for 1 to 3 minutes at a stirring speed of 3,000 rpm to prepare a polyol resin mixture. An isocyanate mixture prepared in Preparation Example based on 100 parts by weight of the polyol resin mixture was added and stirred for 7 to 10 sec at a stirring speed of 3,000 rpm to prepare a sample. A polyethylene film spread in a square shape on a square box mold of 250 mm×250 mm and a sample was poured thereon, and then curing was performed in a room-temperature state.

Apparent density (MS257-06), ILD 25% hardness (MS257-06), permeability (ASTM D-3574-77), flame retardancy (MS300-08) and smell (MS300-34) of the prepared urethane foam were measured, respectively, and the result thereof was illustrated in Table 1 below.

Comparative Example 4

By the same method as Example 1, polyol, a chain extender, a cross-linking agent, a blowing agent, a catalyst, a cell opener, a silicone surfactant, and a heat stabilizer were mixed according to compositions and content ratios illustrated in Table 1 below and sufficiently mixed for 1 to 3 minutes at a stirring speed of 3,000 rpm to prepare a polyol resin mixture.

43.1 parts by weight of toluene diisocyanate (TDI) based on 100 parts by weight of the polyol resin mixture was added and stirred for 7 to 10 sec at a stirring speed of 3,000 rpm to prepare a sample. In addition, a urethane foam specimen was made by the same method as Example 1 and then properties were measured and the result was illustrated in Table 1 below.

Comparative Example 5

A polyurethane filter foam specimen was prepared by using manufacturing equipment as illustrated in FIG. 1.

In detail, polyol, a chain extender, a cross-linking agent, a blowing agent, a catalyst, a cell opener, a silicone surfactant, and a heat stabilizer were mixed according to compositions and content ratios illustrated in Table 1 below and sufficiently mixed for 1 to 3 minutes at a stirring speed of 3,000 rpm to prepare a polyol resin mixture. 43.1 parts by weight of toluene diisocyanate (TDI) based on 100 parts by weight of the polyol resin mixture was added and stirred for 7 to 10 sec at a stirring speed of 3,000 rpm to prepare a sample. A polyethylene film spread in a square shape on a square box mold of 250 mm×mixed for 1 to 3 minutes at a stirring speed of 3,000 rpm to prepare a polyol restemperature state. Thereafter, a reticulation process was additionally performed. In addition, in the prepared urethane foam specimen, properties were measured by the method of Example 1 to be illustrated in Table 1 below.

[Using Components of Polyol Resin Mixture]

(A) Polyether Polyol (A-1) difunctional polyether polyol in which a hydroxyl value is 56 mgKOH/g and EO is capped in a terminal.

(A-2) trifunctional polyether polyol in which hydroxyl value is 26 mgKOH/g, PO is added in the middle, and EO is capped in a terminal.

(A-3) hexafunctional polyether polyol in which a hydroxyl value is 56 mgKOH/g.

(C) Additives (C-1) Chain extender: 1,4-butanediol (C-2) Cross-linking agent: Glycerin (C-3) Blowing agent: Water (C-4) Catalyst: Amine-based catalyst (C-5) Cell opener: EO-additional polyether polyol (C-6) Surfactant: Polysiloxane (C-7) Heat stabilizer: Phenol-based antioxidant (C-8) Flame retarder: Phosphinyl alkyl phosphate ester

TABLE 1

| | | | Example | | | Comparative Example | | | | |
|---|---|---|---|---|---|---|---|---|---|---|
| Classification | | | 1 | 2 | 3 | 1 | 2 | 3 | 4 | 5 |
| Composition | difunctional polyol | Polyol (wt %) | 10 | 20 | 35 | 20 | 20 | — | 60 | 60 |

TABLE 1-continued

| Classification | | Example 1 | Example 2 | Example 3 | Comp. 1 | Comp. 2 | Comp. 3 | Comp. 4 | Comp. 5 |
|---|---|---|---|---|---|---|---|---|---|
| | trifunctional polyol | 40 | 30 | 25 | 30 | 30 | 100 | 40 | 40 |
| | hexafunctional polyol | 50 | 50 | 50 | 50 | 50 | — | — | — |
| | Total content of polyol | 100 | 100 | 100 | 100 | 100 | 100 | 100 | 100 |
| Chain extender | Additives (part by weight) | 5 | 5 | 5 | 5 | 5 | 5 | 5 | 5 |
| Cross-linking agent | | 5 | 3 | 3 | 3 | 3 | 3 | 3 | 3 |
| Blowing agent | | 3 | 3 | 3 | 3 | 3 | 3 | 3 | 3 |
| Amine catalyst | | 1.0 | 1.0 | 1.0 | 1.1 | 1.2 | 1.0 | 1.0 | 1.0 |
| Cell opener | | 1 | 1 | 1 | 5 | 0 | 1 | 1 | 1 |
| Surfactant | | 2 | 2 | 2 | 2 | 2 | 2 | 2 | 2 |
| Heat stabilizer | | 1.5 | 1.5 | 1.5 | 1.5 | 1.5 | 1.5 | 1.5 | 1.5 |
| Flame retardant | | 0 | 0 | 0 | 0 | 0 | 0 | 0 | 15 |
| Preparation Example 1 | Isocyanate (part by weight) | 63 | 59 | 55 | 60 | 55 | 45 | 0 | 0 |
| | T-80 TDI | — | — | — | — | — | — | 43.1 | 43.1 |
| Property | Apparent density (kg/m³) | 58 | 59 | 61 | Collapse | 58 | 58 | 34 | 34 |
| | ILD 25% hardness (kgf/314 cm²) | 23 | 18 | 12 | Collapse | 18 | 10 | 20 | 20 |
| | Permeability (L/min) | 372 | 356 | 335 | Collapse | 192 | 29 | 3 | 342 |
| | Flame retardancy | S.E. | S.E. | S.E. | Collapse | S.E. | S.E. | S.E. | S.E. |
| | Smell (grade) | 2.5 | 2.5 | 2.5 | Collapse | 2.5 | 3 | 3.5 | 4.5 |

*Part by weight: The contents of used additives and isocyanate are represented by part by weight based on 100 parts by weight of the polyol mixture.

According to the result in Table 1, the soft urethane filter foam in Examples 1 to 3 according to the present invention has a porous open-cell structure without additionally performing the reticulation process. These soft urethane filter foams possess the following properties: apparent density of 40 to 65 kg/m³ and, ILD 25% hardness of 10 to 25 kgf/314 cm², and permeability of 200 to 500 L/min. Further, according to Examples 1 to 3, it can be seen that flame retardancy is ensured in the foam itself even though a separate flame retardant is not added. Further, according to Examples 1 to 3, it can be seen that the hardness of the foam is decreased as the content of difunctional polyol among the polyol components is increased.

On the other hand, Comparative Example 1 is an example including a large amount of cell opener, and it can be seen that a collapse phenomenon occurs and the foam is not formed. Comparative Example 2 is an example without a cell opener and has permeability which is not suitable to be applied as the filter foam.

Comparative Example 3 is an example using trifunctional polyether polyol as the polyol component and it can be seen that properties required as the filter foam are not satisfied.

Comparative Examples 4 and 5 are examples using difunctional and trifunctional polyether polyols and toluene diisocyanate (TDI) and Comparative Example 5 is an example of performing an additional reticulation process. In Comparative Example 4, permeability is significantly bad. In Comparative Example 5, permeability can be sufficiently ensured by performing additionally the reticulation process, but smell was generated by residues of the combustion component.

Figure 3:
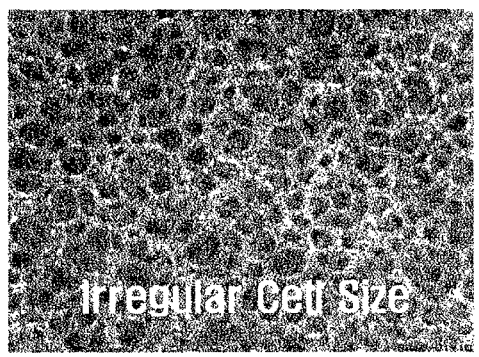
FIG. 3 is an electron micrograph of comparing cell shapes and sizes between polyurethane foam manufactured by a manufacturing method of the present invention and polyurethane foam manufactured by a manufacturing method in the related art.
Figure 3:
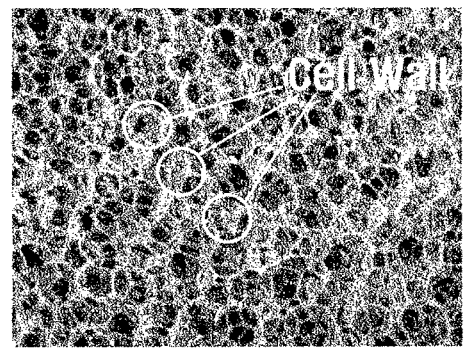
Figure 3:
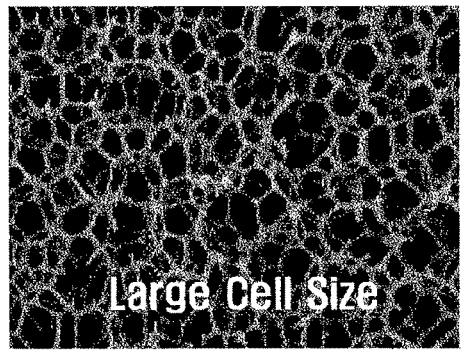

In FIG. 3, electron micrographs for the polyurethane foam manufactured in Example 1 and the polyurethane foam manufactured in Comparative Example 5 are illustrated.

It can be seen that the polyurethane foam manufactured in Example 1 has an open cell having an irregular size. In Comparative Example 5, the foam manufactured in the foaming process has a closed cell structure and the foam has an open cell structure after performing the reticulation process.

According to these results, it can be seen that the composition of the polyol and the isocyanate is specifically configured, and thus permeability can be sufficiently ensured by only a foaming process without additionally performing the reticulation process, the smell is reduced, and foam with ensured flame retardancy and a variety of hardness can be implemented.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polyurethane filter foam manufactured by foaming (A) polyether polyol and (B) methylene diphenyl diisocyanate (MDI),
   wherein the (A) polyether polyol is a polyol resin mixture comprising (A-1) from about 10 to 40 wt % of difunctional polyether polyol having a hydroxyl value of from about 20 to 100 mgKOH/g; (A-2) from about 10 to 50 wt % of trifunctional polyether polyol having a hydroxyl value of 20 to 100 mgKOH/g; and (A-3) from about 10 to 50 wt % of hexafunctional polyether polyol having a hydroxyl value of 50 to 100 mgKOH/g, wherein percent values of (A-1), (A-2) and (A-3) are based on the total weight of the (A) polyether polyol, wherein the (B) methylene diphenyl diisocyanate (MDI) is an isocyanate mixture comprising (B-1) from about 10 to 80 wt % of MDI monomers; (B-2) from about 0.1 to 20 wt % of carbodiimide modified MDI having a weight average molecular weight of from about 250 to 350 g/mol, (B-3) from about 10 to 50 wt % of polymeric MDI having a weight average molecular weight of from about 300 to 400 g/mol, and (B-4) from about 0.1 to 50 wt % of MDI prepolymer having a weight average molecular weight of from about 250 to 1,000 g/mol prepared by prepolymerizing the MDI monomers and the polyether polyol, wherein percent values of (B-1), (B-2) and (B-3) are based on the total weight of the (B) methylene diphenyl diisocyanate, and wherein apparent density measured by MS257-06 is from about 40 to 65 kg/m3, ILD 25% hardness is from about 10 to 25 kgf/314 cm2, and permeability of air is from about 200 to 500 L/min.

2. The polyurethane filter foam of claim 1, wherein the (B) methylene diphenyl diisocyanate (MDI) is included with from about 40 to 70 parts by weight based on 100 parts by weight of the (A) polyether polyol.

3. The polyurethane filter foam of claim 1, wherein the (A-1) difunctional polyether polyol is prepared by adding an ethylene oxide (EO) or propylene oxide (PO) group to a middle or a terminal of a molecular chain.

4. The polyurethane filter foam of claim 1, wherein the (A-1) difunctional polyether polyol is prepared by adding and polymerizing ethylene oxide (EO), propylene oxide (PO), or both the ethylene oxide (EO) and the propylene oxide (PO) to alkylene glycol selected from dipropylene glycol (DPG), diethylene glycol (DEG) and monoethylene glycol (MEG).

5. The polyurethane filter foam of claim 1, wherein the (A-2) trifunctional polyether polyol is prepared by adding and polymerizing ethylene oxide (EO), propylene oxide (PO), or both the ethylene oxide (EO) and the propylene oxide (PO) to polyol selected from glycerin and trimethylolpropane.

6. The polyurethane filter foam of claim 1, wherein the (A-3) hexafunctional polyether polyol is prepared by adding and polymerizing ethylene oxide (EO), propylene oxide (PO), or both the ethylene oxide (EO) and the propylene oxide (PO) to sorbitol.

* * * * *